Patented Jan. 29, 1929.

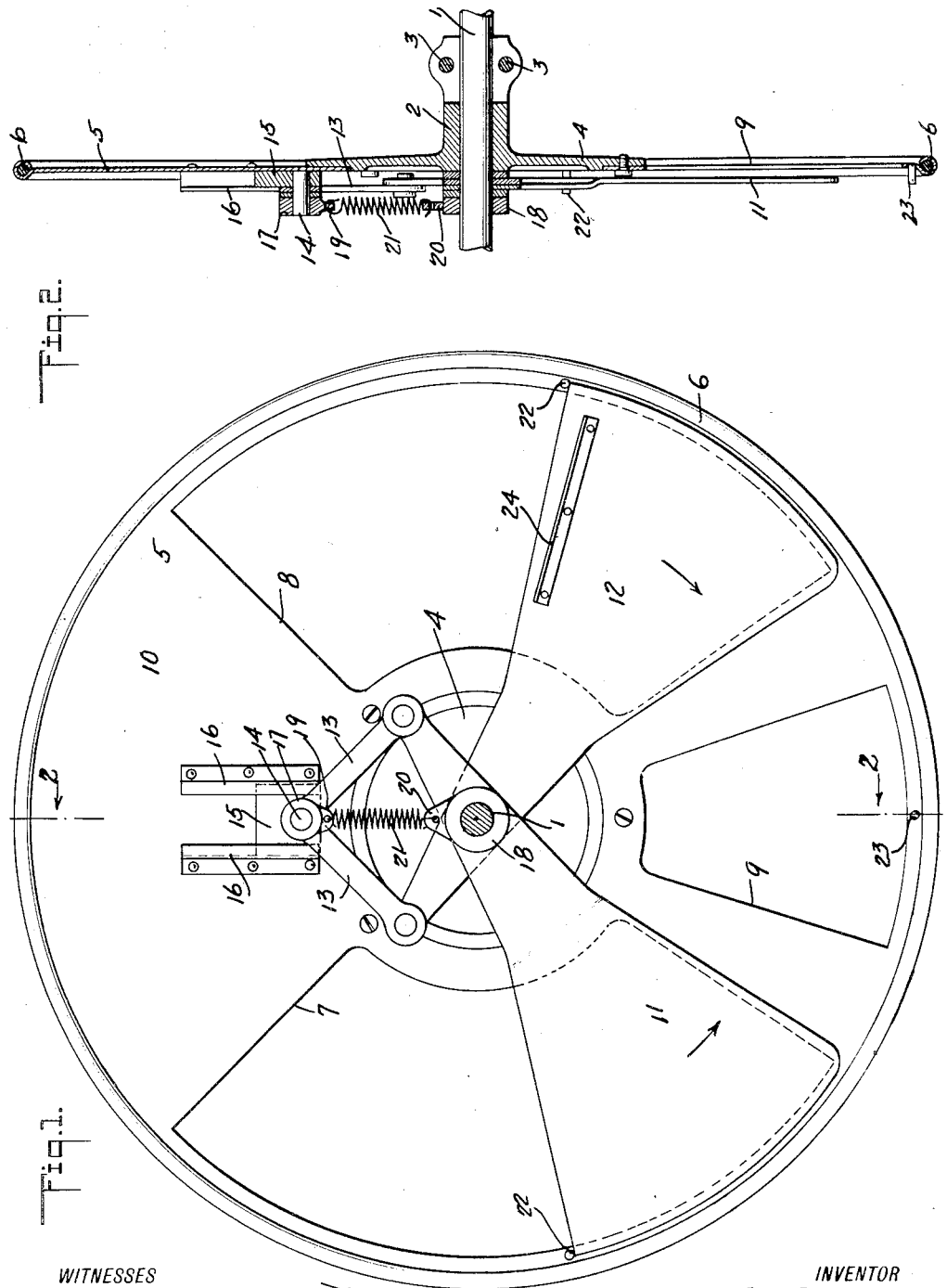

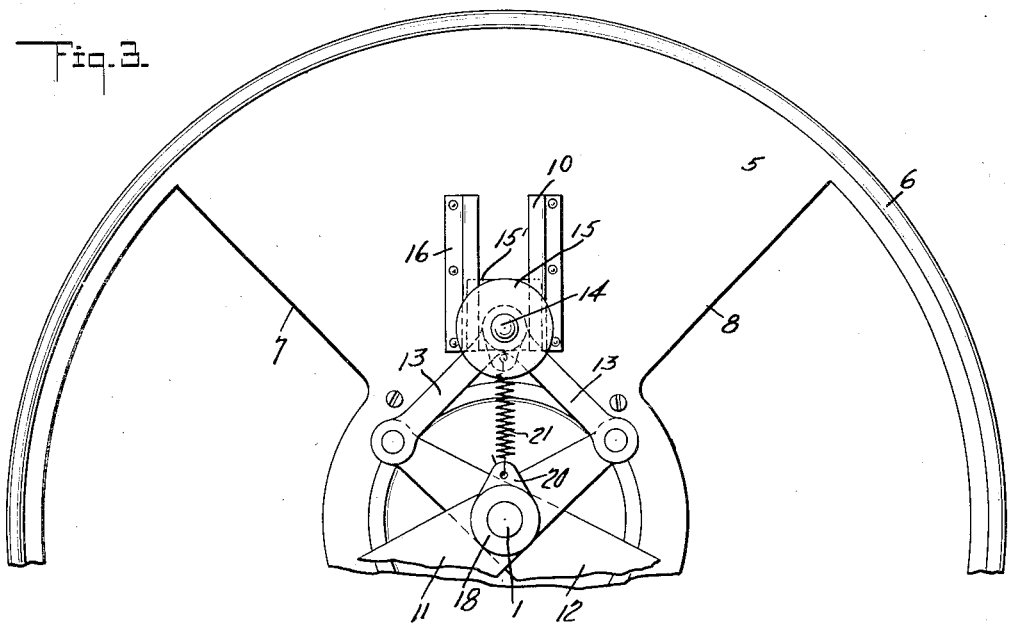
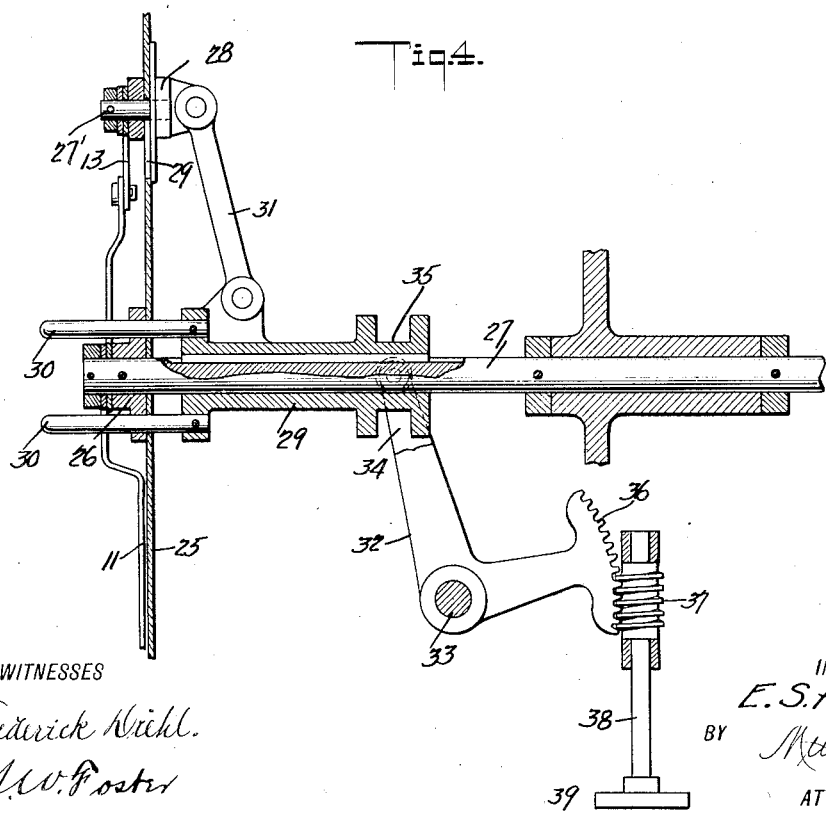

1,700,513

UNITED STATES PATENT OFFICE.

EDWIN STANTON PORTER, OF NEW YORK, N. Y.

SHUTTER FOR MOTION-PICTURE MACHINES.

Application filed January 31, 1923. Serial No. 616,148.

This invention relates to improvements in shutters for motion picture machines, an object of the invention being to provide a shutter of the rotary type having means for adjusting the amplitude of the shutter while in motion and such adjusting being accomplished by relative positions of moving shutter blades, said movement being automatic or manually operated.

A further object is to provide a shutter of the character stated having means whereby the amplitude thereof is adjusted in accordance with the speed of the film and consequent rotary speed of the shutter so as to permit the proper projection at any speed without flicker.

Heretofore it has been the uniform practice to provide shutters having different sizes and arrangements of exposure openings to provide the necessary amplitude in accordance with the speed or rapidity of motion of the film, and hence, in projecting pictures at different speeds it is necessary to change the shutter, and it is the purpose of my invention to provide a single shutter which is automatically or manually controlled so as to function properly at all times regardless of the feed of the film.

With these and other objects in view the invention consists in certain novel features of construction, and combinations and arrangements of parts as will be more fully hereinafter described and pointed out in the claims.

In the accompanying drawings—

Figure 1 is a view in front elevation showing one form of my improved shutter.

Figure 2 is a view in section on the line 2—2 of Figure 1.

Figure 3 is a fragmentary view in front elevation illustrating a modification of my improved shutter.

Figure 4 is a fragmentary view similar to Figure 2 illustrating another modification or one means for manually operating the shutter blades.

1 represents a shutter turning shaft, on which a hub 2 is clamped by suitable bolts 3 and is provided with a disk 4, to which the shutter 5 is secured. The shutter 5 is of the ordinary disk form having a wire enclosing bead 6 at its periphery to strengthen the same and formed with a pair of openings 7 and 8 diametrically opposed to each other and at opposite sides of the shutter disk and also provided with a balancing opening or aperture 9 between said openings 7 and 8 and at a diametrically opposite point of the disk an opaque portion 10 is provided which acts to cover the projection opening of the picture machine during the shifting of the film.

A shutter having openings 7, 8 and 9 as above referred to, is one such as commonly employed for operation on a motion picture machine when used for slow speeds, such for example, at a normal speed of sixty feet per minute or less, the balancing opening 9 being necessary to amplify the exposure to prevent flicker. When high speeds are desired, shutters omitting the openings 9 or reducing the area thereof, are provided, and it is the purpose of my invention to provide a single shutter having blades 11 and 12 thereon which are movable either automatically or manually to increase the areas or sizes of the openings 7 and 8 and decrease the area or size of the opening 9, or vice versa, in accordance with the speed of the film and rotary movement of the shutter.

In Figures 1 and 2 I illustrate one embodiment of my invention, in which the shutter blades 11 and 12 are crossed and pivotally supported near their inner ends on the shaft 1 and are connected at their extreme inner ends by links 13 with a stud 14 on a sliding block 15, the said block 15 mounted to move radially in guides 16 fixed to the shutter 5. A collar 17 is mounted on the stud 14 and a collar 18 is mounted on shaft 1. These collars 17 and 18 have perforated lugs 19 and 20 respectively, which are connected by a coiled spring 21, said spring normally exerting a pull on the stud 14 and through the medium of the links 13, hold the blades 11 and 12 in their extreme position, which is their greatest distance apart, and against stop pins or stops 22 on the shutter 5. A similar pin or stop 23 is provided on the shutter 5 midway between the blades 11 and 12 and serves as an abutment to limit the movement of the shutter blades in the opposite direction, which is their position for closing the opening 9.

One of the shutter blades is formed with an angle plate, or other similar device constituting a vane 24 which is radially positioned relative to the shutter, and which is acted upon by the pressure of the air during the turning movement of the shutter when the latter moves in the direction of the arrow in Figure 1.

The operation of this form of my improved shutter is as follows: Under normal speeds up to say sixty feet per minute for movement of the film, the spring 21 is sufficiently strong to maintain the shutter blades 11 and 12 in the position shown in Figure 1. When the speed of the film and consequent speed of the shutter increases beyond normal, the pressure of air against the vane 24 serves to force the shutter blades toward each other, such movement of the shutter blades being compelled by reason of the arrangement of links 13, stud 14, and sliding block 15, which constitutes in effect a toggle connection. As the blades 11 and 12 are forced toward each other, it will be noted that the sizes of the opening 7 and 8 are increased as said blades normally cover portions of the openings 7 and 8. A continued movement of the blades 11 and 12 toward each other will close or partially close the balancing opening 9 for with highest speeds this balancing opening 9 should be closed and openings 7 and 8 should be of maximum size or area.

In this form of my invention I rely upon the pressure of the air against one of the blades to automatically control the positions of the blades and rely upon the spring 21 to return the blades to normal position when the speed of rotation reaches normal.

In the modification illustrated in Figure 3, the shutter 5 is similar to the shutter 5 shown in Figures 1 and 2 in all respects with the exception that on the stud 14 I provide a weight 15' and dispense with the vane 24 on one of the shutter blades. In this modification the weight 15' is drawn radially outward by centrifugal force overcoming the spring 21, and hence, I utilize this centrifugal force instead of the pressure of the air to control the position of the blades.

To illustrate one means whereby the desired results may be accomplished manually, I have illustrated in Figure 4 a shutter 25 carried by a hub 26 fixed upon a shaft 27. This shutter 25, which is similar to the shutter 5 of the preferred form, is provided with blades similar thereto, only one of said blades 11 being shown as the view is in longitudinal section.

The blades are connected by links 13 with a stud 27' carried by a block or slide 28, the shutter 25 having a radial slot 29, through which the stud projects so that the sliding block 28 may be on the inner or rear face of the shutter. A sleeve 29 is keyed or splined to the shaft 27 and is provided at one end with a pair of pins 30 which project through the shutter 25 and hub 26 to compel the shutter and hub to turn with the sleeve but permit longitudinal movement of the sleeve on the shaft 27 without affecting the coupling of the parts. This sliding sleeve 29 is connected by a link 31 with the block 28 so that when the said sleeve is moved longitudinally of the shaft, the block 28 will be given a radial movement in relation to the shutter 25, and hence, cause the blades 11 and 12 to move toward or away from each other. To accomplish this movement of the sleeve 29, I provide a bell crank lever 32 suitably pivoted, as shown at 33, and having a forked end 34 engaging in an annular groove 35 on sleeve 29. One end of this bell crank lever 32 has a sector 36 in mesh with a worm or screw 37 on an operating shaft 38, the latter having a knob or handwheel 39 to turn the same.

It will thus be noted that in Figure 4, I have illustrated a manually operated means for controlling the positions of the shutter blades and the operation of this manually controlled means is as follows: Upon turning the shaft 38, the worm or screw 37 meshing with the sector 36, imparts a pivotal movement to the bell crank lever 32 and this movement of the lever 32 imparts a longitudinal movement to the sleeve 29. The movement of the sleeve 29, through the medium of the link 31, imparts a radial movement to the block 28 on the shutter 25 and this radial movement of the block 28 imparts pivotal movement to the shutter blades 11 and 12 to cause them to move toward or away from each other.

It will be noted that with all forms of my invention above described and illustrated in the drawings, the amplitude of the shutter is controlled so that a single shutter with its necessary attachments can be used on a picture machine for any desired speed of projection or movement of the film, and while I have illustrated what I believe to be preferred embodiments of my invention, it is to be understood that I do not limit myself to the precise details set forth, but consider myself at liberty to make such changes and alterations as fairly fall within the spirit and scope of the appended claims.

I claim:

1. In a rotary shutter, the combination of two permanent blades positioned opposite each other, one of said blades having an opening formed therein, two movable blades associated with said shutter and adapted to normally close over portions of the openings formed between said two permanent blades, said blades adapted to be moved during the rotation of said shutter thereby increasing the areas of said openings between the permanent blades and to close over the opening in said permanent blade, said movable blades being constructed and positioned so that during the first part of their movements they do not decrease the effective opening of the opening in the permanent blade, and means for moving said movable blades.

2. In a rotary shutter, the combination of a permanent blade and a movable blade assembled together to form therebetween predetermined sized open spaces, and an air vane mounted on said movable blade for causing the movement thereof during the rotation of said shutter by reason of the air pressure against said blade to thereby vary the areas of said openings between said blades, and means for normally resisting the movement of said movable blade during the rotation of said shutter.

3. In a rotary shutter the combination of two blades permanently positioned opposite one another, one of said blades having an opening formed therein, a movable blade associated with said shutter, said movable blade in its normal position adapted to cover a part of one opening formed between said two permanent blades, said movable blade adapted to be moved from its normal position to a position covering a portion of said opening in said permanent blade, and an air vane affixed to said movable blade to cause said blade to move relatively to said permanent blades when said shutter is rotated.

4. In a rotary shutter, the combination of two blades permanently positioned opposite one another, one of said blades having an opening formed therein, two movable blades associated with said shutter and adapted to close over portions of openings formed between said two permanent blades, said movable blades constructed to be moved during the rotation of said shutter to cover over the opening in said permanent blade and to increase the areas of the openings between said two permanent blades, and an air vane affixed to one of said movable blades to cause said movable blade to have movement relative to said permanent blades when said shutter is rotated.

5. In a rotary shutter the combination of a pair of permanently formed blades positioned opposite one another, one of said blades having a balancing opening therein, a pair of movable blades pivotally mounted at the center of said shutter, said movable blades having extensions beyond the point of mounting and in lines with the longest axes of said blades, links engaging said extensions and having the free ends of said links pivoted together, a plate carried by the fully closed permanent blade and constructed to receive and hold the joining ends of said links, guides for holding said plate on said permanent blade while permitting said plate to be moved along said permanent blade, a spring mounted between the joined ends of said links and the central pivot point of said shutter to normally position said movable blades to cover predetermined areas of the openings formed between said permanent blades, an air vane mounted on one of said movable blades for causing said movable blades to be moved when said shutter rotates to increase the areas of the openings between said permanent blades and to close over the opening in the permanent blade.

6. The combination with a shutter of the character described having main exposure apertures, and a balancing aperture between them, of a pair of blades pivotally mounted on the shutter and normally in position to partially cover the main apertures, one of said blades being formed with a vane against which the pressure of air operates to cause the movement of the blades.

7. The combination with a motion picture machine shutter having openings or apertures therein, of a pair of crossed blades pivotally supported at the center of the shutter, links connecting the inner ends of the blades guides on the shutter, a block mounted to move in the guides, a stud on the block receiving the inner ends of said links, a spring connecting the stud with the pivot point of the blades, whereby said spring operates to hold the blades normally apart, a vane on one of said blades operated by pressure of air thereagainst to force the blades toward each other, and stops on the shutter limiting the movement of the blades in both directions.

EDWIN STANTON PORTER.